United States Patent
Inagaki et al.

(10) Patent No.: US 7,085,900 B2
(45) Date of Patent: Aug. 1, 2006

(54) BACKUP TECHNIQUE FOR DATA STORED ON MULTIPLE STORAGE DEVICES

(75) Inventors: Takeshi Inagaki, Sagamihara (JP); Norie Iwasaki, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 10/448,519

(22) Filed: May 30, 2003

(65) Prior Publication Data

US 2004/0010668 A1    Jan. 15, 2004

(30) Foreign Application Priority Data

May 30, 2002  (JP) .............................. 2002-158247

(51) Int. Cl.
   *G06F 12/16* (2006.01)
(52) U.S. Cl. ...................... 711/162; 711/114; 707/202; 707/204
(58) Field of Classification Search ................ 711/162, 711/114; 707/202, 204
   See application file for complete search history.

(56) References Cited

U.S. PATENT DOCUMENTS

| | | | | |
|---|---|---|---|---|
| 5,487,160 A | * | 1/1996 | Bemis | 711/114 |
| 6,131,148 A | * | 10/2000 | West et al. | 711/162 |
| 6,505,216 B1 | * | 1/2003 | Schutzman et al. | 707/204 |
| 6,671,786 B1 | * | 12/2003 | Wang et al. | 711/162 |
| 2001/0008008 A1 | * | 7/2001 | Mori | 711/114 |
| 2002/0103966 A1 | * | 8/2002 | Wu et al. | 711/114 |

* cited by examiner

*Primary Examiner*—Pierre Bataille
*Assistant Examiner*—Sheng-Jen Tsai
(74) *Attorney, Agent, or Firm*—Timothy N. Ellis (57) ABSTRACT

Provided is a backup device, etc., that updates copy data appropriately. A backup device 300, which records as copy data a copy of original data stored in multiple storage devices 110A to 110D, comprises: a write data storage unit 132, for receiving and storing write data to be written to the original data; and an updating unit 134, for using the write data to update the copy data when update permission data, which permit the use of the write data to update the copy data, are externally received.

10 Claims, 6 Drawing Sheets

BACKUP TECHNIQUE FOR DATA STORED ON MULTIPLE STORAGE DEVICES

BACKGROUND

1. Technical Field

The present invention relates to a backup technique for data stored in multiple storage devices, and relates in particular to a backup device, a backup system and a program therefor, and a recording medium for the recording of the program.

2. Description of Related Art

A device has previously been employed that asynchronously stores in a recording device a backup of original data stored in another recording device.

Problems to be Solved by the Invention

However, when the original data are to be stored in multiple recording devices, the backup device may overwrite the copy data, while for the recording devices, no uniformity in the writing of data to the original data is obtained. Therefore, when an obstacle is encountered in the recording device wherein the original data are stored, proper recovery of the copy data will not be possible.

SUMMARY

It is, therefore, one object of the present invention to provide a backup device, a backup system, a control method, a program and a recording medium for storing this program that can resolve the above problem. This object can be achieved by combining the features described in the independent claims of the present invention and in the dependent claims that further define specific, effective examples for the present invention.

Solution to the Problems

Specifically, according to a first aspect of the invention, a backup device or a backup system for recording, as copy data, a copy of original data stored in multiple storage devices, comprises:

a write data storage unit for receiving and storing write data to be written to said original data; and an updating unit for employing said write data to update said copy data when update permission data, which permit the updating of said copy data using said write data, are externally received. Further, a control method for controlling this device or system, a program therefor, and a recording medium for storing the program are provided.

DETAILED DESCRIPTION

Preferred Embodiment of the Invention

The present invention will now be described by referring to the following embodiment; however, the invention is not limited to this embodiment, and all the combinations of features explained in the embodiment are not always required for achieving the invention.

Figure 1:
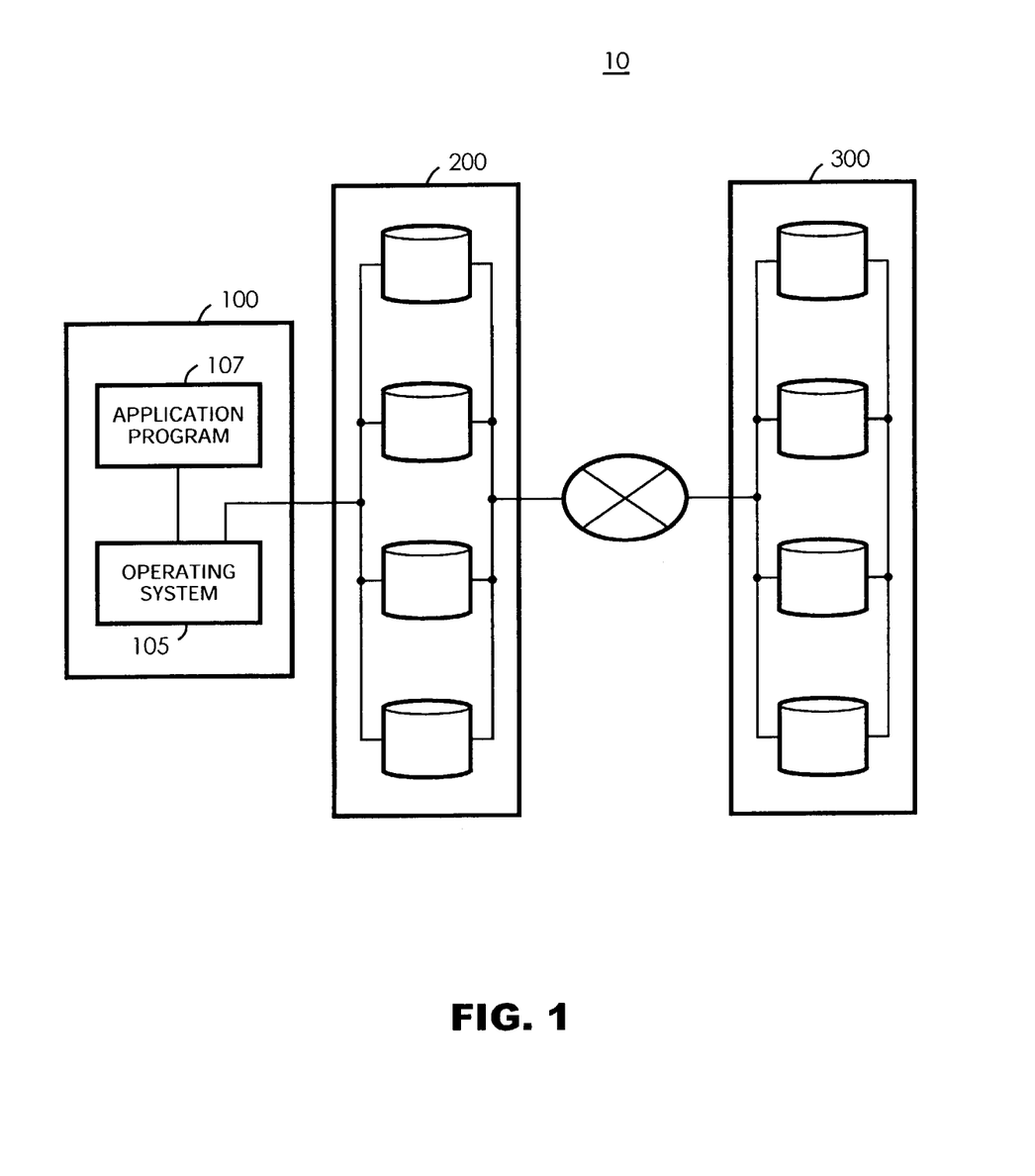
FIG. 1 is a schematic diagram showing a backup system 10.

FIG. 1 is a schematic diagram showing a backup system 10. The backup system 10 comprises: a server 100, a storage system 200 and a backup device 300. In this embodiment, the server 100 executes an operating system 105 and an application program 107, such as a database management program. Upon receiving instructions from the operating system 105 and the application program 107, the server 100 writes the original data to or reads the original data from the storage system 200, as needed. And in accordance with an instruction issued by the server 100, the storage system 200 receives and stores write data to be written to the original data. The backup device 300 stores copy data, which is a copy of the original data, and also receives the write data from the storage system 200. The backup device 300 also employs the write data to update the copy data when update permission data, which permit the updating of the copy data using the write data, are received from the server 100.

The backup device 300 asynchronously receives write data from the storage system 200. Therefore, when the backup system 300 is receiving write data from the storage system 200, an instruction from the server 100 can be accepted by the storage system 200 and original data stored in the storage system 200 can be updated. Thus, when the waiting period for communication between the storage system 200 and the backup device 300 is extended, e.g., when the storage system 200 and the backup device 300 are located at a long physical distance, the storage system 200 and the backup device 300 need not perform the processing synchronously, and the backup system 100 can be operated at high speed.

Figure 2:
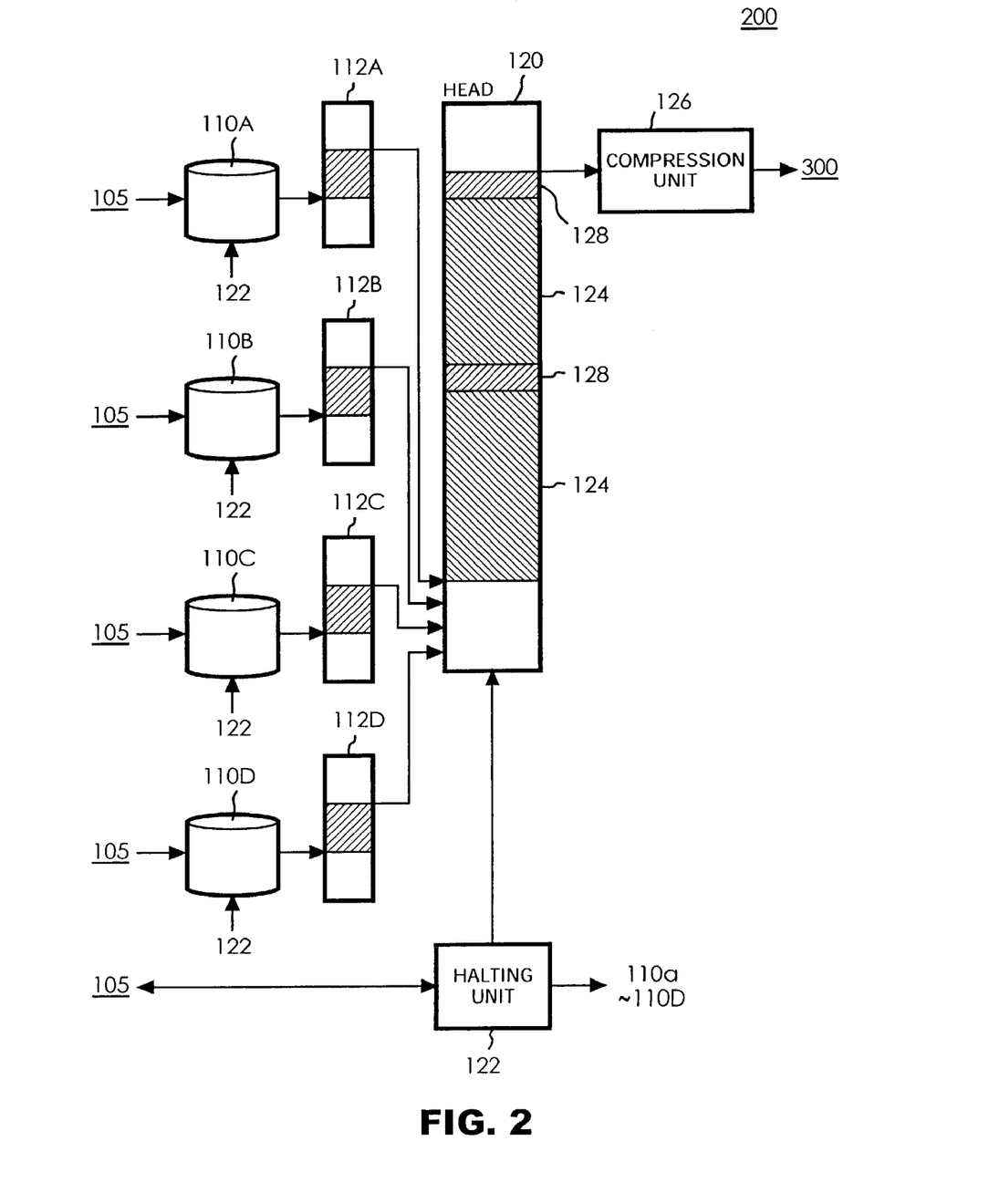
FIG. 2 is a functional block diagram showing a storage system 200.

FIG. 2 is a functional block diagram showing the storage system 200. The storage system 200 includes storage devices 110A to 110D, write data temporary storage units 112A to 112D, an acquisition unit 120, a halting unit 122 and a compression unit 126. The storage devices 110A to 110D may be disk devices provided for physically different units, or they may be volumes or partitions obtained by logically dividing a disk device. That is, the storage devices 110A to 110D may be physical storage devices, such as hard disk drives (HDD), tape drives or magneto-optical disk drives, or they may be logical storage devices, such as volumes or partitions thereof.

The operating system 105 accesses the storage devices 110A to 110D in accordance with instructions received from the application program 107. When the process for writing a relevant data series is terminated, the application program 107 transmits update permission data to the operating system 105. When the operating system 105 receives from the application program 107 the update permission data, the operating system 105 transmits this update permission data to the halting unit 122. The operating system 105 may also transmit the update permission data to the halting unit 122 at a predetermined interval. Further, when the operating system 105 has not accepted an access of the original data for a predetermined period of time, it may transmit the update permission data to the halting unit 122. In this manner, the operating system 105 manages the writing of data to the write data temporary storage units 112A to 112D.

When the storage device 110A receives from the operating system 105 write data to be written to the original data, the storage device 110A stores the write data therein, and also transmits the write data to the write data temporary storage unit 112A. The write data temporary storage unit 112A receives and stores the write data transmitted by the storage device 110A.

When the halting unit 122 receives the update permission data from the operating system 105, it transmits a write data shift instruction through the storage device 110A to the write data temporary storage unit 112A. Upon receiving, through the storage device 110A, the write data shift instruction from the halting unit 122, the write data temporary storage unit 112A transmits the stored write data to the acquisition unit 120 and deletes the write data stored in the write data temporary storage unit 112A (or, instead, adds information indicating that the write data has already been transmitted). In this case, in order to ensure the uniformity of the write data to be shifted, the halting unit 122 temporarily stops the accessing of the original data, stored in the storage device 110A, by the operating system 105. Sequentially, thereafter, the halting unit 122 transmits the update permission data to the acquisition unit 120.

The acquisition unit 120, which is, for example, a first-in-first-out queue, sequentially receives write data from the write data temporary storage unit 112A and stores the write data in the order in which they are received. In addition, the acquisition unit 120 receives, and stores, the update permission data output by the operating system 105 though the halting unit 122. Then, beginning at the head of the first-in-first-out queue, the acquisition unit 120 transmits write data 124 and update permission data 128 to the compression unit 126.

The compression unit 126 sequentially receives the write data 124 and the update permission data 128 from the acquisition unit 120, and then compresses the write data 124 for each unit for which writing is permitted, in accordance with the update permission data 128, and transmits the compressed data to the backup device 300.

The storage devices 110B to 110D are substantially the same as the storage device 110A, and each transmits write data and other data to the write data temporary storage units 112B to 112D in accordance with instructions received from the operating system 105. Since the operations performed by the storage devices 110B to 110D and the write data temporary storage units 112B to 112D are substantially the same as those performed by the storage device 110A and the write data storage unit 112A, no explanation for them will be given.

As is described above, in accordance with instructions received from the operating system 105, the storage system 200 can sequentially store the write data and the update permission data in the acquisition unit 120, and can transmit these data to the backup device 300.

Figure 3:
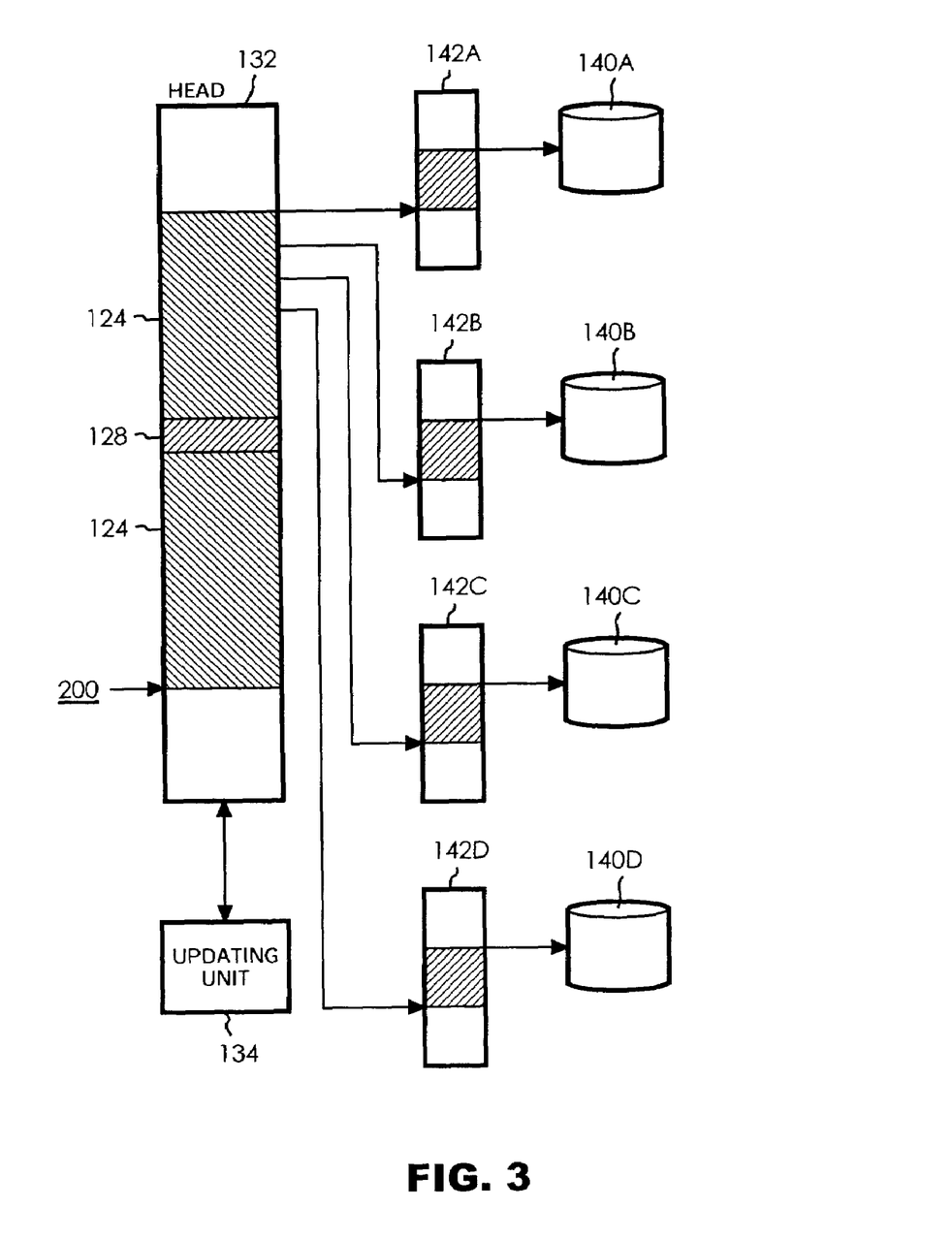
FIG. 3 is a functional block diagram showing a backup device 300.

FIG. 3 is a functional block diagram showing the backup device 300. The backup device 300 includes a write data storage unit 132, an updating unit 134, copy data storage units 140A to 140D, and copy data temporary storage units 142A to 142D.

The write data storage unit 132 receives the write data 124 and the update permission data 128 from the storage system 200, and sequentially stores it in a first-in-first-out queue. Further, the write data storage unit 132 expands the compressed write data 124 and transmits the decompressed data to the copy data temporary storage units 142A to 142D. As another example, the write data storage unit 132 may transmit the compressed write data 124, unchanged, through the copy data temporary storage units 142A to 142D to the copy data storage units 140A to 140D. In this case, the copy data storage units 140A to 140D may either store the write data 124 unchanged, or may expand the write data 124 and store it as decompressed write data 124.

When the updating unit 134 receives the update permission data 128 through the write data storage unit 132, the updating unit 134 transmits, to the copy data temporary storage units 142A to 142D, the write data 124 that were stored in the write data storage unit 132 before the update permission data 128 were stored therein. For example, the updating unit 134 analyzes the order wherein data are arranged in the write data storage unit 132 to determine whether the write data 124 located nearest the head, preceding the update permission data 128, were stored before the update permission data 128. Then, the updating unit 134 transmits the pertinent write data 124 to the copy data temporary storage units 142A to 142D.

The copy data temporary storage units 142A to 142D receive the write data 124, transmitted by the write data storage unit 132, and store it temporarily. Then, the copy data temporary storage units 142A to 142D sequentially transmit the write data 124 to the copy data storage units 140A to 140D.

The copy data storage units 140A to 140D, wherein the copy data are stored, respectively receive the write data 124 from the copy data temporary storage units 142A to 142D, and use the write data 124 to update the copy data.

As is described above, when the backup device 300 receives the update permission data from the storage system 200, the backup device 300 can update the copy data by using the write data 124 that were received before the update permission data 128.

Figure 4:
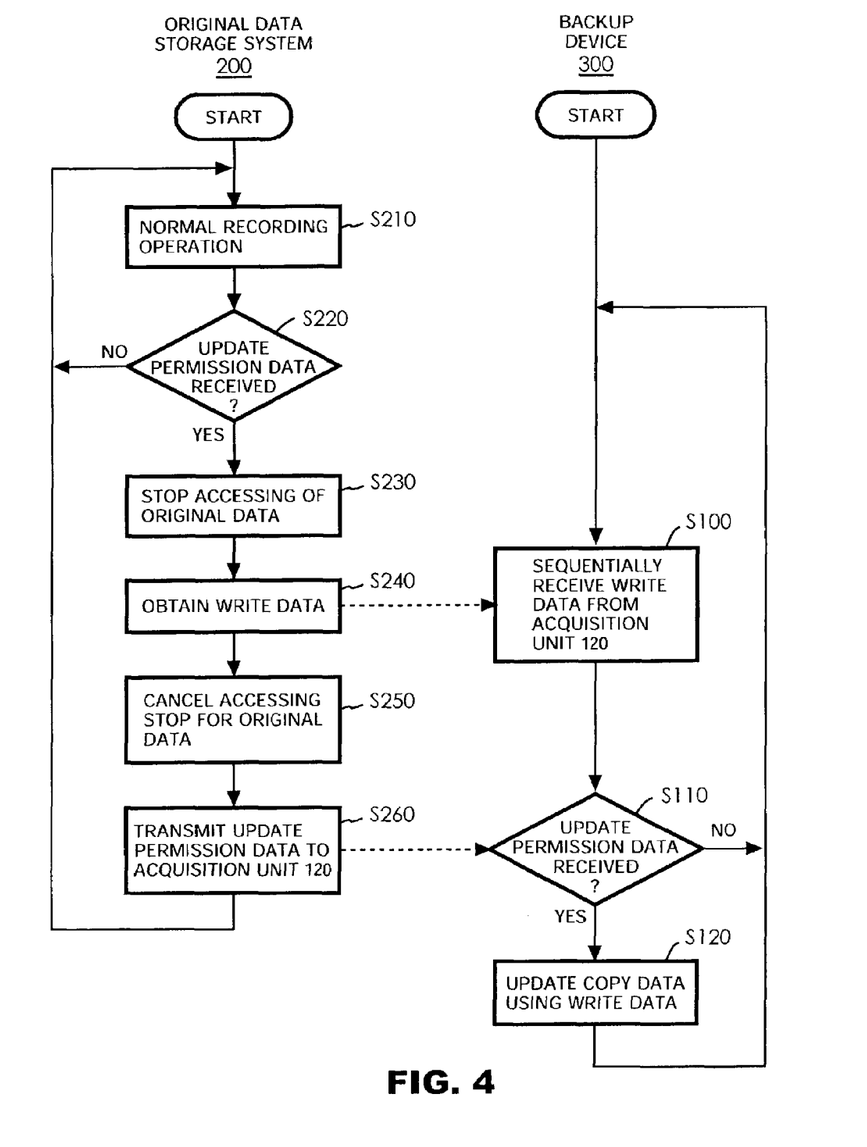
FIG. 4 is a flowchart showing the operations of the storage system 200 and the backup device 300.

FIG. 4 is a flowchart showing the operations of the storage system 200 and the backup device 300. The storage system 200 initiates the normal recording processing in accordance with instructions received from the server 100 and the operating system 105 (S210). When the update permission data has been received (YES at S220), the halting unit 122 stops the accessing of the original data stored in the storage devices 110A to 110D (S210). The acquisition unit 120 then obtains, from the write data temporary storage units 112A to 112D, the write data 124 (S240), and stores the write data 124 and sequentially transmits it to the backup device 300. When the acquisition unit 120 has completed the acquisition of the write data 124, the halting unit 122 removes the stop imposed on the accessing of the original data (S250). Thereafter, the halting unit 122 transmits the update permission data to the acquisition unit 120 (S260).

The write data storage unit 132 (for example, a first-in-first-out queue) receives the write data 124 from the acquisition unit 120, and arranges and stores the write data 124 in the order in which they are received. The updating unit 134 then analyzes the data stored in the write data storage unit 132 to determine whether the update permission data 128 have been received (YES at S110). When it is ascertained that the update permission data 128 have been received (YES at S110), the updating unit 134 outputs the write data 124 in the write data storage unit 132 and uses the write data 124 to update the copy data.

In this manner, the backup device 300 can sequentially receive the write data 124, and can update the copy data asynchronously with the operation of the storage system 200. Furthermore, since the backup device 300 updates the copy data based on the update permission data 128 received from the server 100, the copy of the original data recorded in multiple storage devices can be maintained while uniformity of the data is ensured.

Figure 5:
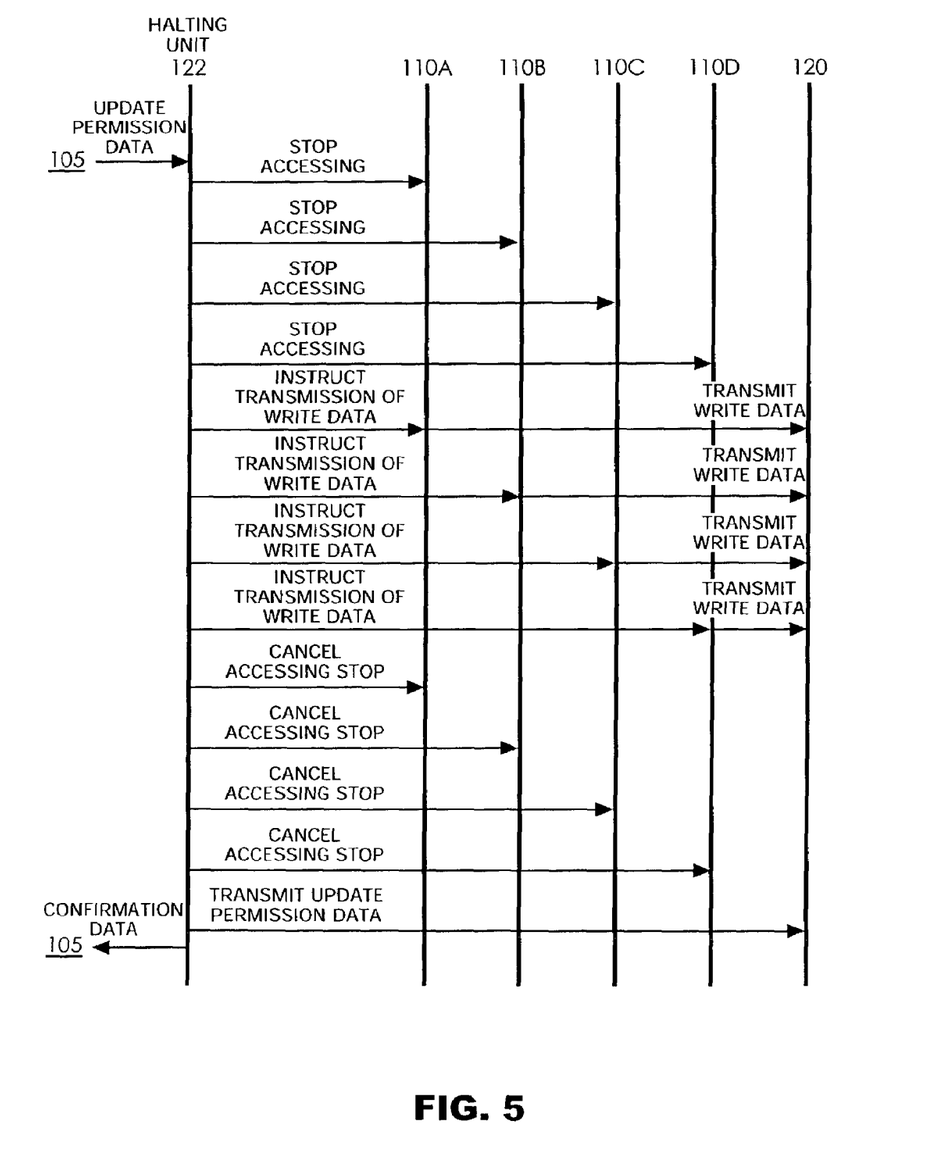
FIG. 5 is a time chart showing the operation of a halting unit 122.

FIG. 5 is a flowchart showing an example operation performed by the halting unit 122. Upon receiving the update permission data 128 from the operating system 105, the halting unit 122 stops the accessing by the operating system 105 and the application program 107 of the original data stored in the storage devices 110A to 110D. In FIG. 5, for example, the halting unit 122 stops the accessing of the original data by inhibiting the writing of data to the storage devices 110A to 110D. To stop the accessing of the original data, the halting unit 122 may also transmit to the operating system 105 an instruction inhibiting the accessing of the storage devices 110A to 110D.

Then, the halting unit 122 transmits, through the storage devices 110A to 110D, a write data shift instruction to the write data temporary storage units 112A to 112D, so that the acquisition unit 120 can obtain the write data 124 from the write data temporary storage units 112A to 112D.

When the shifting of the write data 124 has been completed, the halting unit 122 releases the stop placed on the accessing of the storage devices 110A to 110D, and transmits the update permission data 128 to the acquisition unit 120. Thereafter, the halting unit 122 transmits, to the operating system 105, confirmation data indicating that the shifting of the write data 124 from the storage devices 110A to 110D has been successful. Upon receiving the confirmation data, the operating system 105 and the application program 107 resume the information processing using the storage devices 110A to 110D.

As is described above, during a period beginning with the start, by the acquisition unit 120, of the acquisition of the write data 124 from the storage devices 110A to 110D, and continuing until the acquisition process has been completed, the halting unit 122 can stop the accessing of the original data by the operating system 105.

As another example for this processing sequence, the halting unit 122 may employ a snapshot function provided in advance for the storage devices 110A to 110D. In this case, upon receiving the update permission data 128 from the operating system 105, first, the halting unit 122, as in the above case, stops the accessing of the storage devices 110A to 110D and prepares snapshots of the data stored in the storage devices 110A to 110D. When the creation of the snapshots is successful, the halting unit 122 permits the operation performed by the operating system 105 to be resumed, and asynchronously moves the snapshot data from the storage devices 110A to 110D to the acquisition unit 120. When this shifting has been completed, the halting unit 122 deletes the snapshots from the storage devices 110A to 110D.

Figure 6:
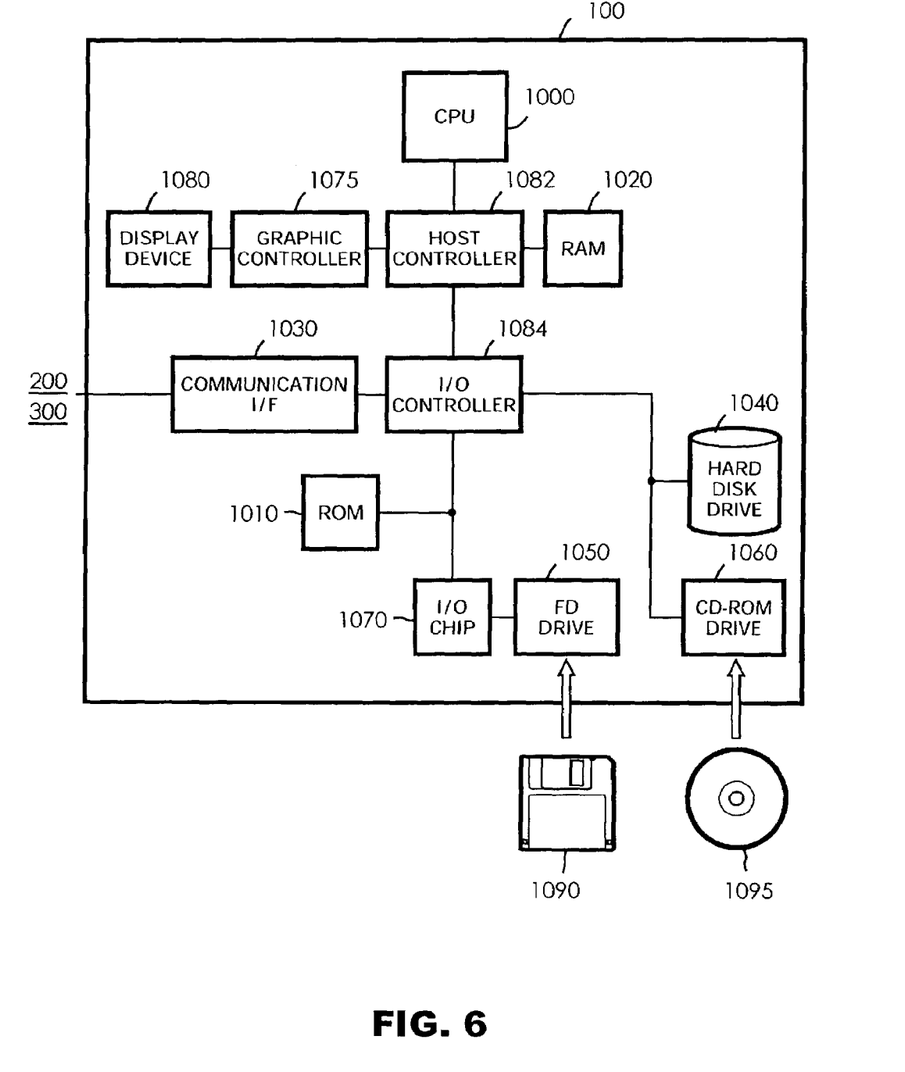
FIG. 6 is a diagram showing an example hardware configuration for a server 100.

FIG. 6 is a diagram showing an example hardware configuration for the server 100. The server 100 in this embodiment comprises: a CPU periphery section that includes a CPU 1000, a RAM 1020, a graphic controller 1075 and a display device 1080, which are interconnected by a host controller 1082; an input/output section that includes a communication interface 1030, a hard disk drive 1040 and a CD-ROM drive 1060, which are connected to the host controller 1082 by an input/output controller 1084; and a legacy input/output section that includes a ROM 1010, a floppy disk drive 1050 and an input/output chip 1070, which are connected to the input/output controller 1084.

The host controller 1082 connects the RAM 1020 to the CPU 1000, which accesses the RAM 1020 at a high transfer rate, and the graphic controller 1075. The CPU 1000, the operation of which is based on programs stored in the ROM 1010 and the RAM 1020, controls the individual sections, while the graphic controller 1075 obtains image data that the CPU 1000, for example, generates in a frame buffer provided in the RAM 1020, and displays the image data on the display device 1080. Instead of this, however, the graphic controller 1075 may internally include a frame buffer for storing image data generated by the CPU 1000.

The input/output controller 1084 connects the host controller 1082 to the communication interface 1030, which is a comparatively fast input/output device, the hard disk drive 1040 and the CD-ROM drive 1060. The communication interface 1030 communicates with another device across a network, while the hard disk drive 1040 stores programs and data, used by the server 100, that the CD-ROM drive 1060 reads from a CD-ROM 1095 and transmits to the input/output chip 1070 through the RAM 1020.

The input/output controller 1084 also connects the ROM 1010 to comparatively slow input/output devices, such as the floppy disk drive 1050 and the input/output chip 1070. The ROM 1010 is used to store a boot program that the CPU 1000 executes as the server 100 is activated, and a program that depends on the hardware of a personal computer main body. The floppy disk drive 1050 reads a program or data from the floppy disk 1090, and transmits the program or data to the input/output chip 1070 through the RAM 1020. The input/output chip 1070 connects the floppy disk 1090 to the various input/output devices through a parallel port, a serial port, a keyboard port and a mouse port, for example. Furthermore, the input/output chip 1070 transmits to the storage system 200 and the backup device 300, through the communication interface 1030, a program or data provided by the floppy disk drive 1050 or the CD-ROM drive 1060.

The programs that implement the storage system 200 and the backup device 300 are an acquisition module, a halting module, a compression module, an updating module and a write data storage module. These modules are programs that permit the storage system 200 and the backup device 300 to function as the acquisition unit 120, the halting unit 122, the compression unit 126, the write data storage unit 132 and the updating unit 134.

The programs for the storage system 200 and the backup device 300 are provided by a user while being stored on a recording medium, such as the floppy disk 1090, the CD-ROM 1095 or an IC card. The programs are read from the recording medium and installed, through the input/output chip 1070, for the storage system 200 and the backup device 300, and are executed by the storage system 200 and the backup device 300. The storage system 200 and the backup device 300 may instead additionally include floppy disk drives, CD-ROM drives or IC card readers, and may read the programs directly from recording media and execute them.

The programs or the above modules may be stored on an external storage medium. This storage medium can not only be a floppy disk 1090 or a CD-ROM 1095, but can also be an optical recording medium such as a DVD or PD, a magneto-optical recording medium such as an MD, a tape medium or a semiconductor memory such as an IC card. In addition, a storage device, such as a hard disk or a RAM provided for a server system connected to a private communication network or the Internet, may be employed as a recording medium, and programs may be provided through the network for the storage system 200 and the backup device 300.

As is apparent from the embodiment, upon receiving update permission data from the operating system 105, for example, the backup device 300 updates the copy data by using the write data to be written to the original data stored in the storage devices 110A to 110D. Therefore, the backup device 300 can appropriately update the copy data and maintain the uniformity of the data, thereby ensuring that the data can be accessed by the operating system 105.

The present invention has been explained by referring to the embodiment; however, the technical scope of the invention is not limited to that described in the embodiment. The embodiment can be variously modified or improved, and as is obvious from the claims for the invention, such a modification or improvement can be included within the technical scope of the invention.

According to the embodiment, the backup device, the backup system, the control method, the recording medium and the program described in the following entries can be implemented.

(Entry 1) A backup device for recording, as copy data, a copy of original data stored in multiple storage devices, comprising:
 a write data storage unit for receiving and storing write data to be written to the original data; and
 an updating unit for employing the write data to update the copy data when update permission data, which permit the updating of the copy data using the write data, are externally received.

(Entry 2) A backup device according to entry 1, wherein the write data storage unit is a first-in-first-out queue for sequentially storing the received write data and the update permission data; and wherein the updating unit updates the copy data using the write data that are stored in the first-in-first-out queue before the update permission data are stored in the first-in-first-out queue.

(Entry 3) A backup device according to entry 1, further comprising:
 a compression unit for compressing the write data for each data unit for which writing is permitted in accordance with the update permission data, and for transmitting the compressed write data to the write data storage unit,
 wherein the update unit decompresses the compressed write data, and employs the obtained data to update the copy data.

(Entry 4) A backup device according to entry 1, further comprising:
 a copy data storage unit for storing the copy data.

(Entry 5) A backup system comprising:
 multiple storage devices for storing the original data;
 a copy data storage unit for recording the copy of the original data as copy data;
 an acquisition unit for obtaining, from the multiple storage devices, write data written to the original data;
 a write data storage unit for storing the write data obtained by the acquisition unit; and
 an updating unit for employing the write data to update the copy data when update permission data, which permit the updating of the copy data using the write data, are externally received.

(Entry 6) A backup system according to entry 5, further comprising:
 a halting unit for halting an external access of the original data during a period extending from when the acquisition unit starts the acquisition, from the multiple storage devices, of the write data until the acquisition unit terminates the acquisition of the write data.

(Entry 7) A backup system according to entry 5, further comprising:
 an operating system for managing the writing of data to the multiple storage devices,
 wherein, in accordance with an external instruction, the operating system transmits the update permission data to the updating unit.

(Entry 8) A backup system according to entry 5, further comprising:
 an operating system for managing the writing of data to the multiple storage devices,
 wherein the operating system transmits the update permission data to the updating unit at predetermined intervals.

(Entry 9) A backup system according to entry 5, further comprising:
 an operating system for managing the writing of data to the multiple storage devices,
 wherein, when the operating system has not accepted the accessing of the original data during a predetermined period of time, the operating system transmits the update permission data to the updating unit.

(Entry 10) A method for controlling a backup device that records, as copy data, a copy of original data stored in multiple storage devices, comprising the steps of:
 receiving write data to be written to the original data; and
 employing the write data to update the copy data when update permission data, which permit the updating of the copy data using the write data, are externally received.

(Entry 11) A control method comprising the steps of:
 externally receiving and storing original data;
 recording a copy of the original data as copy data;
 obtaining write data written to the original data;
 storing the obtained write data; and
 employing the write data to update the copy data when update permission data, which permit the updating of the copy data using the write data, are externally received.

(Entry 12) A program for permitting a computer to record, as copy data, a copy of original data stored in multiple storage devices, and for operating the computer to function as:
 a write data storage unit for receiving and storing write data to be written to the original data; and
 an updating unit for employing the write data to update the copy data when update permission data, which permit the updating of the copy data using the write data, are externally received.

(Entry 13) A program for controlling a backup system, which employs a computer having multiple storage devices for storing original data, and for operating the computer so that the computer functions as:
 a copy data storage unit for recording a copy of the original data as copy data;
 an acquisition unit for obtaining, from the multiple storage devices, write data written to the original data;
 a write data storage unit for storing the write data obtained by the acquisition unit; and
 an updating unit for employing the write data to update the copy data when update permission data, which permit the updating of the copy data using the write data, are externally received.

(Entry 14) A recording medium storing a program according to entry 12.

(Entry 15) A recording medium storing a program according to entry 13.

ADVANTAGE OF THE INVENTION

As is apparent from the above explanation, according to the present invention, copy data can be appropriately updated.

What is claimed is:

1. A backup system, comprising:
   a storage device;
   a write data temporary storage unit coupled to the storage device;
   an acquisition unit coupled to the write data temporary storage unit;
   a halting unit coupled to the acquisition unit;
   a compression unit coupled to the acquisition unit;
   a write data storage unit coupled to the compression unit;
   an updating unit coupled to the write data storage unit;
   a copy data temporary storage unit coupled to the write data storage unit; and
   a copy data storage unit coupled to the copy data temporary storage unit;
   wherein the halting unit is configured to perform the following operations:
   determining if update permission data is received;
   and if so:
      stopping the accessing of original data stored in the storage device;
      removing the stop imposed on the accessing of the original data stored in the storage device, responsive to the acquisition unit completing obtaining write data;
      transmitting the update permission data to the acquisition unit;
      transmitting a write data shift instruction to the write data temporary storage unit; and
      transmitting confirmation data indicating that the shifting of the write data from the storage device to the acquisition unit has been successful;
         wherein the operation of stopping the accessing of original data stored in the storage device comprises:
            inhibiting the writing of data to the storage device; and
            transmitting an instruction inhibiting the accessing of the storage device;
   wherein the acquisition unit is configured to perform the following operations:
      obtaining write data from the write data temporary storage unit,
      storing the write data in the acquisition unit; and
      transmitting the write data and the update permission data from the acquisition unit;
   wherein the write data storage unit is configured to perform the following operations:
      receiving the write data; and
      storing the write data in the order in which it is received;
   and wherein the updating unit is configured to perform the following operations:
      analyzing the data stored in the write data storage unit to determine whether the update permission data has been received;
      and if so:
         outputting the write data in the write data storage unit; and
         updating the copy data using the write data.

2. The backup system of claim 1 further comprising:
   a second storage device;
   a second write data temporary storage unit coupled to the second storage device and to the acquisition unit;
   a second copy data storage unit; and
   a second copy data temporary storage unit coupled to the second copy data storage unit and to the write data storage unit.

3. A backup system comprising:
   a plurality of storage devices;
   a plurality of write data temporary storage units, wherein each write data temporary storage unit is coupled to a respective storage device in the plurality of storage devices;
   an acquisition unit coupled to each write data temporary storage unit;
   a halting unit coupled to the acquisition unit;
   a write data storage unit coupled to the acquisition unit;
   an updating unit coupled to the write data storage unit;
   a plurality of copy data temporary storage units coupled to the write data storage unit; and
   a plurality of copy data storage units, wherein each copy data storage unit is coupled to a respective copy data temporary storage unit in the plurality of copy data temporary storage units;
   and wherein the halting unit is configured to perform the following operations:
   determining if update permission data is received;
   and if so:
      stopping the accessing of original data stored in the plurality of storage devices;
      removing the stop imposed on the accessing of the original data stored in the plurality of storage devices, responsive to the acquisition unit completing obtaining write data; and
      transmitting the update permission data to the acquisition unit;
   and wherein the acquisition unit is configured to perform the following operations:
      obtaining write data from the plurality of write data temporary storage units,
      storing the write data in the acquisition unit; and
      sequentially transmitting the write data from the acquisition unit;
   and wherein the write data storage unit is configured to perform the following operations:
      receiving the write data; and
      storing the write data in the order in which it is received;
   and wherein the updating unit is configured to perform the following operations:
      analyzing the data stored in the write data storage unit to determine whether the update permission data has been received;
      and if so:
         outputting the write data in the write data storage unit; and
         updating the copy data using the write data.

4. A backup system comprising:
   first means for receiving, storing, and transmitting write data;
   second means for receiving the write data from the first means, and for storing the write data, and for receiving a write data shift instruction, and for, responsive to receiving the write data shift instruction, transmitting write data;

means for determining if update permission data is received;
means for stopping the accessing of original data stored in a plurality of storage devices;
means for removing the stop imposed on the accessing of the original data stored in the plurality of storage devices, responsive to an acquisition unit completing obtaining write data;
means for transmitting the update permission data to the acquisition unit;
means for obtaining write data from a plurality of write data temporary storage units,
means for storing the write data in the acquisition unit;
means for sequentially transmitting the write data from the acquisition unit;
means for transmitting the update permission data from the acquisition unit;
means for compressing the write data and the update permission data;
means for transmitting the compressed update permission data and update permission data;
means for storing the write data in the order in which it is received;
means for analyzing data stored in a write data storage unit to determine whether the update permission data has been received;
means for outputting write data in the write data storage unit;
means for temporarily storing the write data after the write data in the write data storage unit is outputted;
means for transmitting the temporarily stored write data;
means for updating copy data using the write data; and
means for storing the updated copy data.

5. A method for backing up data, the method comprising the following operations:
transmitting update permission data from an application program to an operating system;
transmitting the update permission data from the operating system to a halting unit;
writing original data from a server to a plurality of storage devices, prior to the operation of transmitting the update permission data from the operating system to the halting unit;
receiving at a plurality of storage devices, from the operating system, write data to be written to original data;
storing the write data in the plurality of storage devices;
transmitting the write data to a plurality of write data temporary storage units;
storing the write data in the plurality of write data temporary storage units;
responsive to the halting unit receiving the update permission data from the operating system, transmitting a write data shift instruction from the halting unit to the plurality of write data temporary storage units;
transmitting the stored write data from the plurality of write data temporary storage units to an acquisition unit;
stopping permitting the operating system to access the original data stored in the plurality of storage devices;
transmitting the update permission data from the halting unit to the acquisition unit;
sequentially receiving at the acquisition unit, write data from the plurality of write data temporary storage units;
storing the write data in the acquisition unit in the order in which it is received;
storing the update permission data in the acquisition unit;
receiving confirmation at the operating system, that transmitting of the stored write data from the write data temporary storage unit to the acquisition unit has been completed;
after the operation of stopping permitting the operating system to access the original data stored in the plurality of storage devices, and after the operation of transmitting the stored write data from the plurality of write data temporary storage units to the acquisition unit, performing the operation of resuming information processing using the plurality of storage devices;
transmitting write data and update permission data from the acquisition unit, wherein the write data and update permission data transmitted from the acquisition unit are transmitted to a compression umt;
compressing the write data for each data unit for which writing is permitted, in accordance with the update permission data, and compressing the update permission data;
transmitting the compressed write data and the compressed update permission data from the compression unit to a backup device;
receiving at a write data storage unit, the write data and the update permission data;
sequentially storing the write data and the update permission data in the write data storage unit;
receiving the update permission data at an updating unit;
transmitting to a plurality of copy data temporary storage units, the write data that was stored in the write data storage unit before the update permission data was stored in the write data storage unit;
storing in the plurality of copy data temporary storage units, the write data that was stored in the write data storage unit before the update permission data was stored in the write data storage unit;
sequentially transmitting from the plurality of copy data temporary storage units to a plurality of copy data storage units, the write data that was stored in the write data storage unit before the update permission data was stored in the write data storage unit; and
using the write data to update the copy data in the plurality of copy data storage units.

6. The method of claim 5, wherein the operations further comprise adding information to the plurality of write data temporary storage units, indicating that the write data has been transmitted from the plurality of write data temporary storage units.

7. The method of claim 5, wherein the operating system transmits the update permission data to the halting unit when the operating system has not accepted an access of the original data for a predetermined period of time.

8. A backup system, comprising:
a storage device;
a write data temporary storage unit coupled to the storage device; and
an acquisition unit coupled to the write data temporary storage unit; and
wherein the storage device is configured to:
receive write data and store the write data in the storage device, and
transmit the write data to the write data temporary storage unit;
wherein the write data temporary storage unit is configured to:

receive the write data from the storage device;
store the write data in the write data temporary storage unit;
receive a write data shift instruction; and
responsive to receiving the write data shift instruction, transmit the write data stored in the write data temporary storage unit to the acquisition unit;
wherein the acquisition unit is configured to:
receive the write data from the write data temporary storage unit;
store the write data in the acquisition unit;
receive update permission data;
store the update permission data in the acquisition unit; and
transmit the write data and update permission data;
a halting unit coupled to the acquisition unit and to the storage device, wherein the halting unit is conflaured to:
receive the update permission data; and
responsive to receiving the update permission data:
inhibit the writing of data to the storage device;
and after inhibiting the writing of data to the storage device, transmit the write data shift instruction to the write data temporary storage unit to instruct the write data temporary storage unit to transmit the write data stored in the write data temporary storage unit to the acquisition unit;
and after the acquisition unit has received the write data from the write data temporary storage unit, remove the inhibition of the writing of data to the storage device;
and after removing the inhibition of the writing of data to the storage device, transmit the update permission data to the acquisition urut;
wherein the update permission data is transmitted to the halting unit at a predetermined interval.

9. A backup system, comprising:
a storage device;
a write data temporary storage unit coupled to the storage device; and
an acquisition unit coupled to the write data temporary storage unit; and
wherein the storage device is configured to:
receive write data and store the write data in the storage device, and
transmit the write data to the write data temporary storage unit;
wherein the write data temporary storage unit is configured to:
receive the write data from the storage device;
store the write data in the write data temporary storage unit;
receive a write data shift instruction; and
responsive to receiving the write data shift instruction, transmit the write data stored in the write data temporary storage unit to the acquisition unit;
wherein the acquisition unit is configured to:
receive the write data from the write data temporary storage unit;
store the write data in the acquisition unit;
receive update permission data;
store the update permission data in the acquisition unit; and
transmit the write data and update permission data;
a halting unit coupled to the acquisition unit and to the storage device, wherein the halting unit is configured to:
receive the update permission data; and
responsive to receiving the update permission data;
inhibit the writing of data to the storage device;
and after inhibiting the writing of data to the storage device, transmit the write data shift instruction to the write data temporary storage unit to instruct the write data temporary storage unit to transmit the write data stored in the write data temporary storage unit to the acquisition unit;
and after the acquisition unit has received the write data from the write data temporary storage unit, remove the inhibition of the writing of data to the storage device;
and after removing the inhibition of the writing of data to the storage device, transmit the update permission data to the acquisition unit;
a plurality of additional storage devices coupled to the halting unit; and
a plurality of additional write data temporary storage units, wherein each additional write data temporary storage unit is coupled to a corresponding one of the additional storage devices; and
wherein each of the additional storage devices is configured to:
receive write data and store the received write data; and
to transmit the stored write data to the corresponding one of the additional write data temporary storage units;
wherein each of the additional write data temporary storage units is configured to:
receive and store the write data transmitted from the corresponding one of the additional storage devices;
receive the write data shift instruction; and
responsive to receiving the write data shift instruction, transmit the respective stored write data to the acquisition unit;
wherein the acquisition unit is further configured to:
receive and store the write data transmitted respectively from each of the additional write data temporary storage units; and
transmit the write data received from each of the additional write data temporary storage units; and
wherein the halting unit is further configured to:
responsive to receiving the update permission data:
inhibit the writing of data to the storage device and to each of the additional storage devices;
and after inhibiting the writing of data to the storage device and to each of the additional storage devices, transmit the write data shift instruction to the write data temporary storage unit and to each of the additional write data temporary storage units to instruct the write data temporary storage unit and each additional write data temporary storage unit to transmit the write data stored in the respective write data temporary storage unit to the acquisition unit;
and after the acquisition unit has received the write data from the write data temporary storage unit and from each additional write data temporary storage unit, remove the inhibition of the writing of data to the storage device and each additional storage device;
and after removing the inhibition of the writing of data to the storage device and to each additional storage device, transmit the update permission data to the acquisition unit.

10. The backup system of claim 9, further comprising:
a plurality of additional copy data temporary storage units, wherein each additional copy data temporary storage unit is coupled to the write data storage unit; and
a plurality of additional copy data storage units, wherein each additional copy data storage unit is coupled to a corresponding one of the additional copy data temporary storage units, and
wherein the write data storage unit is further configured to:
 transmit to each of the additional copy data temporary storage units, respective write data stored in the write data storage unit before the update permission data were stored in the write data storage unit;
wherein each additional copy data temporary storage unit is configured to:
 receive and store the respective write data from the write data storage unit; and
 transmit the respective write data received from the write data storage unit to the corresponding additional copy data storage unit; and
wherein each additional copy data storage unit is configured to:
 receive the respective write data from the corresponding one of the copy data temporary storage units; and
 store the respective write data to update respective copy data.

* * * * *